(12) United States Patent
Shimamoto et al.

(10) Patent No.: US 10,018,390 B2
(45) Date of Patent: Jul. 10, 2018

(54) AIR-CONDITIONING APPARATUS

(71) Applicants: Daisuke Shimamoto, Tokyo (JP); Yuji Motomura, Tokyo (JP); Osamu Morimoto, Tokyo (JP); Takayoshi Honda, Tokyo (JP); Tatsuo Ono, Tokyo (JP); Koji Nishioka, Tokyo (JP)

(72) Inventors: Daisuke Shimamoto, Tokyo (JP); Yuji Motomura, Tokyo (JP); Osamu Morimoto, Tokyo (JP); Takayoshi Honda, Tokyo (JP); Tatsuo Ono, Tokyo (JP); Koji Nishioka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 344 days.

(21) Appl. No.: 14/439,341

(22) PCT Filed: Nov. 30, 2012

(86) PCT No.: PCT/JP2012/081069
§ 371 (c)(1),
(2) Date: Apr. 29, 2015

(87) PCT Pub. No.: WO2014/083678
PCT Pub. Date: Jun. 5, 2014

(65) Prior Publication Data
US 2015/0260440 A1 Sep. 17, 2015

(51) Int. Cl.
*F25D 17/02* (2006.01)
*F25B 49/02* (2006.01)
(Continued)

(52) U.S. Cl.
CPC .............. *F25B 49/02* (2013.01); *F25B 13/00* (2013.01); *F25B 25/005* (2013.01); *F25B 31/02* (2013.01);
(Continued)

(58) Field of Classification Search
CPC .... F25B 2600/23; F25B 25/005; F25B 49/02; F25B 31/02; F25B 13/00;
(Continued)

(56) References Cited

U.S. PATENT DOCUMENTS 3,575,296 A * 4/1971 Peterson ................. F04C 2/102
137/115.15
2004/0003613 A1* 1/2004 Shin ....................... F25D 11/022
62/199

(Continued)

FOREIGN PATENT DOCUMENTS

CN 102422092 A 4/2012
JP 2006-153324 A 6/2006
(Continued)

OTHER PUBLICATIONS

Office Action dated Oct. 8, 2016, 2016 in corresponding CN patent application No. 2012800771094 (and English tanslation).
(Continued)

*Primary Examiner* — Ana Vazquez
(74) *Attorney, Agent, or Firm* — POSZ LAW GROUP, PLC

(57) ABSTRACT

An air-conditioning apparatus includes actuation control means including an actuation unit that sequentially opens heat medium flow switching devices or heat medium flow control devices on a one-by-one basis. The actuation control means performs control in such a manner that start time of driving of pumps is later than start of actuation of the heat medium flow switching devices and the heat medium flow control devices.

8 Claims, 10 Drawing Sheets

(51) Int. Cl.
*F25B 13/00* (2006.01)
*F25B 25/00* (2006.01)
*F25B 31/02* (2006.01)
*F24F 3/06* (2006.01)

(52) U.S. Cl.
CPC ......... *F24F 3/065* (2013.01); *F25B 2313/006* (2013.01); *F25B 2313/023* (2013.01); *F25B 2313/0231* (2013.01); *F25B 2313/0272* (2013.01); *F25B 2313/02743* (2013.01); *F25B 2600/13* (2013.01); *F25B 2600/23* (2013.01); *F25B 2600/2513* (2013.01); *F25B 2600/2515* (2013.01); *F25B 2700/1931* (2013.01); *F25B 2700/1933* (2013.01); *Y02B 30/745* (2013.01)

(58) Field of Classification Search
CPC ........ F25B 2313/0231; F25B 2313/023; F25B 2700/1931; F25B 2313/02743; F25B 2313/0272; F25B 2600/2513; F25B 2700/1933; F25B 2600/2515; F25B 2600/13; Y02B 30/745
See application file for complete search history.

(56) References Cited

U.S. PATENT DOCUMENTS

| 2006/0123815 A1* | 6/2006 | Kim | F24F 3/065 |
| | | | 62/200 |
| 2011/0146339 A1* | 6/2011 | Yamashita | F24F 3/06 |
| | | | 62/513 |
| 2011/0185756 A1* | 8/2011 | Yamashita | F24F 3/06 |
| | | | 62/171 |
| 2012/0031605 A1* | 2/2012 | Takayama | F24F 11/008 |
| | | | 165/201 |

FOREIGN PATENT DOCUMENTS

| JP | WO 2010128553 A1 * | 11/2010 | ............ F24F 11/008 |
| JP | 2012-127641 A | 7/2012 | |
| WO | 2010/050004 A1 | 5/2010 | |
| WO | 2010/128553 A1 | 11/2010 | |
| WO | 2012/101677 A1 | 8/2012 | |

OTHER PUBLICATIONS

International Search Report of the International Searching Authority dated Feb. 12, 2013 for the corresponding international application No. PCT/JP2012/081069 (and English translation).

Extended European Search Report dated Jul. 4, 2016 issued in corresponding EP patent application No. 12889026.6.

Office Action dated May 10, 2017 issued in corresponding CN patent application No. 2012800771094 (and English tanslation).

* cited by examiner

F I G. 1
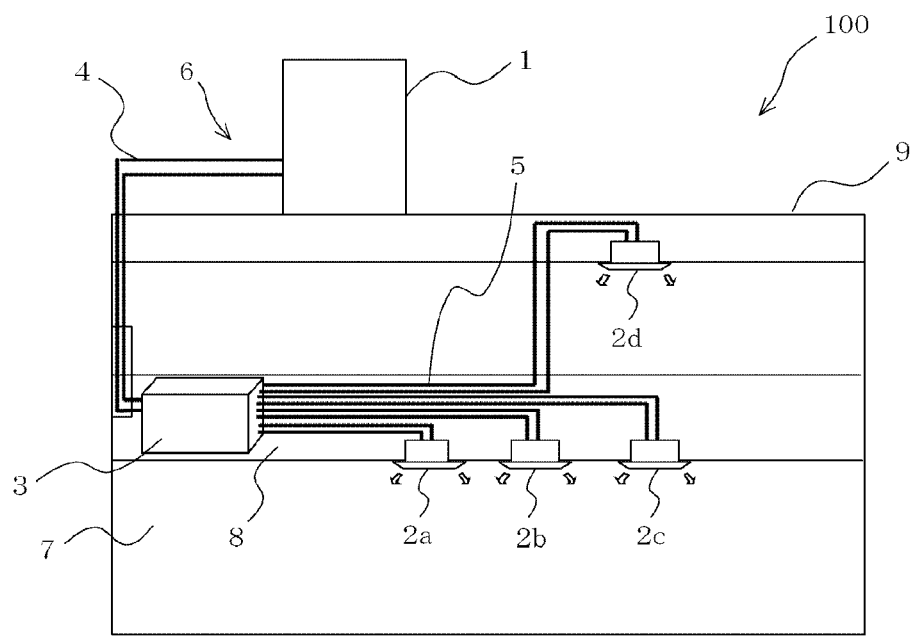

FIG. 7A
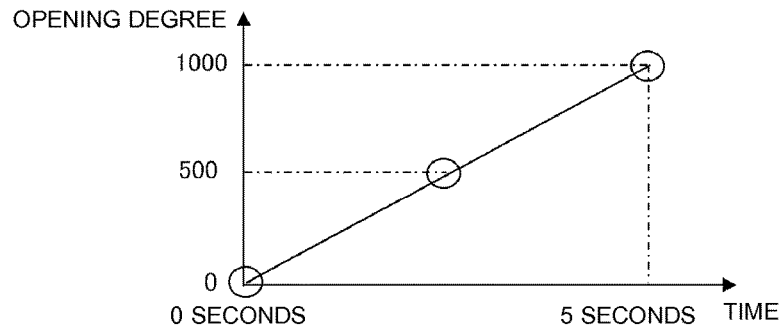
FIG. 7B
[FLOW RATE PROPORTION]
| TARGET DEVICE | OPENING DEGREE LEVEL 0 | OPENING DEGREE LEVEL 500 | OPENING DEGREE LEVEL 1000 |
|---|---|---|---|
| FIRST HEAT MEDIUM FLOW SWITCHING DEVICE 22 | 100% ↑ / 0% ← 100% | 50% ↑ / 50% ← 100% | 0% ↑ / 100% ← 100% |
| SECOND HEAT MEDIUM FLOW SWITCHING DEVICE 23 | 100% ↓ / 0% → 100% | 50% ↓ / 50% → 100% | 0% ↓ / 100% → 100% |
FIG. 8A
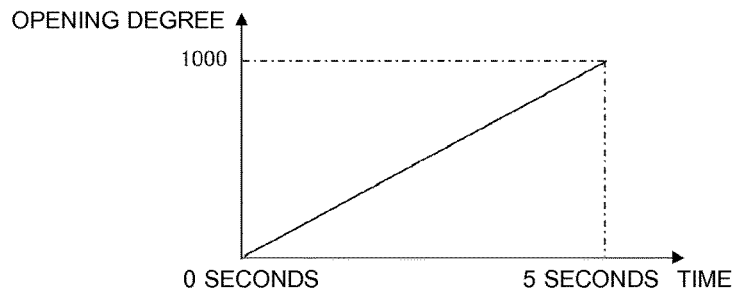
FIG. 8B
| TARGET DEVICE | OPENING DEGREE LEVEL 0 | OPENING DEGREE LEVEL 500 | OPENING DEGREE LEVEL 1000 |
|---|---|---|---|
| FIRST HEAT MEDIUM FLOW CONTROL DEVICE 25 | 0% | 50% | 100% |

FIG. 9

ACTUATION PATTERN 1 [USE OF SINGLE ACTUATION UNIT]

| ACTUATION ORDER | 1 | 2 | 3 | 4 | 5 | 6 | 7 | 8 | 9 | 10 | 11 | 12 |
|---|---|---|---|---|---|---|---|---|---|---|---|---|
| VALVE | 22a | 22b | 22c | 22d | 23a | 23b | 23c | 23d | 25a | 25b | 25c | 25d |
| MAXIMUM ACTUATION TIME (SECONDS) | 5 | 5 | 5 | 5 | 5 | 5 | 5 | 5 | 5 | 5 | 5 | 5 |
| MAXIMUM ACCUMULATED ACTUATION TIME (SECONDS) | 5 | 10 | 15 | 20 | 25 | 30 | 35 | 40 | 45 | 50 | 55 | 60 |
| OPENING TIME OF FIRST BRANCH (SECONDS) | | | | | | | | | O | | | |
| ACTUATION OF PUMPS 21 | | | | | | | | | O | | | |
| ACTUATION OF COMPRESSOR 10 | O | | | | | | | | | | | |

FIG. 10

ACTUATION PATTERN 2 [USE OF SINGLE ACTUATION UNIT]

| ACTUATION ORDER | 1 | 2 | 3 | 4 | 5 | 6 | 7 | 8 | 9 | 10 | 11 | 12 |
|---|---|---|---|---|---|---|---|---|---|---|---|---|
| VALVE | 22a | 23a | 22b | 23b | 22c | 23c | 22d | 23d | 25a | 25b | 25c | 25d |
| MAXIMUM ACTUATION TIME (SECONDS) | 5 | 5 | 5 | 5 | 5 | 5 | 5 | 5 | 5 | 5 | 5 | 5 |
| MAXIMUM ACCUMULATED ACTUATION TIME (SECONDS) | 5 | 10 | 15 | 20 | 25 | 30 | 35 | 40 | 45 | 50 | 55 | 60 |
| OPENING OF FIRST BRANCH | | | | | | | | | O | | | |
| ACTUATION OF PUMPS 21 | | | | | | | | | O | | | |
| ACTUATION OF COMPRESSOR 10 | | | | | | | | | O | | | |

FIG. 11

ACTUATION PATTERN 3 [USE OF SINGLE ACTUATION UNIT]

| ACTUATION ORDER | 1 | 2 | 3 | 4 | 5 | 6 | 7 | 8 | 9 | 10 | 11 | 12 |
|---|---|---|---|---|---|---|---|---|---|---|---|---|
| VALVE | 22a | 23a | 25a | 22b | 23b | 25b | 22c | 23c | 25c | 22d | 23d | 25d |
| MAXIMUM ACTUATION TIME (SECONDS) | 5 | 5 | 5 | 5 | 5 | 5 | 5 | 5 | 5 | 5 | 5 | 5 |
| MAXIMUM ACCUMULATED ACTUATION TIME (SECONDS) | 5 | 10 | 15 | 20 | 25 | 30 | 35 | 40 | 45 | 50 | 55 | 60 |
| OPENING OF FIRST BRANCH | | | O | | | | | | | | | |
| ACTUATION OF PUMPS 21 | | | O | | | | | | | | | |
| ACTUATION OF COMPRESSOR 10 | O | | | | | | | | | | | |

FIG. 12

ACTUATION PATTERN 4 [USE OF TWO ACTUATION UNITS]

| ACTUATION ORDER | 1 | 2 | 3 | 4 | 5 | 6 |
|---|---|---|---|---|---|---|
| VALVE | 22a | 25a | 23b | 22c | 25c | 23d |
| MAXIMUM ACTUATION TIME (SECONDS) | 5 | 5 | 5 | 5 | 5 | 5 |
| MAXIMUM ACCUMULATED ACTUATION TIME (SECONDS) | 5 | 10 | 15 | 20 | 25 | 30 |
| OPENING OF FIRST BRANCH | | ○ | | | | |
| ACTUATION OF PUMPS 21 | | ○ | | | | |
| ACTUATION OF COMPRESSOR 10 | ○ | | | | | |
| ACTUATION ORDER | 1 | 2 | 3 | 4 | 5 | 6 |
| VALVE | 23a | 22b | 25b | 23c | 22d | 25d |
| MAXIMUM ACTUATION TIME (SECONDS) | 5 | 5 | 5 | 5 | 5 | 5 |
| MAXIMUM ACCUMULATED ACTUATION TIME (SECONDS) | 5 | 10 | 15 | 20 | 25 | 30 |
| OPENING OF FIRST BRANCH | | ○ | | | | |
| ACTUATION OF PUMPS 21 | | ○ | | | | |
| ACTUATION OF COMPRESSOR 10 | ○ | | | | | |

FIG. 13

ACTUATION PATTERN 5 [USE OF THREE ACTUATION UNITS]

| ACTUATION ORDER | 1 | 2 | 3 | 4 |
|---|---|---|---|---|
| VALVE | 22a | 22b | 22c | 22d |
| MAXIMUM ACTUATION TIME (SECONDS) | 5 | 5 | 5 | 5 |
| MAXIMUM ACCUMULATED ACTUATION TIME (SECONDS) | 5 | 10 | 15 | 20 |
| OPENING OF FIRST BRANCH | O | | | |
| ACTUATION OF PUMPS 21 | O | | | |
| ACTUATION OF COMPRESSOR 10 | O | | | |
| ACTUATION ORDER | 1 | 2 | 3 | 4 |
| VALVE | 23a | 23b | 23c | 23d |
| MAXIMUM ACTUATION TIME (SECONDS) | 5 | 5 | 5 | 5 |
| MAXIMUM ACCUMULATED ACTUATION TIME (SECONDS) | 5 | 10 | 15 | 20 |
| OPENING OF FIRST BRANCH | O | | | |
| ACTUATION OF PUMPS 21 | O | | | |
| ACTUATION OF COMPRESSOR 10 | O | | | |
| ACTUATION ORDER | 1 | 2 | 3 | 4 |
| VALVE | 25a | 25b | 25c | 25d |
| MAXIMUM ACTUATION TIME (SECONDS) | 5 | 5 | 5 | 5 |
| MAXIMUM ACCUMULATED ACTUATION TIME (SECONDS) | 5 | 10 | 15 | 20 |
| OPENING OF FIRST BRANCH | O | | | |
| ACTUATION OF PUMPS 21 | O | | | |
| ACTUATION OF COMPRESSOR 10 | O | | | |

AIR-CONDITIONING APPARATUS

CROSS REFERENCE TO RELATED APPLICATIONS

This application is a U.S. national stage application of PCT/JP2012/081069 filed on Nov. 30, 2012, the content of which is incorporated herein by reference.

TECHNICAL FIELD

The present invention relates to an air-conditioning apparatus which is used as, for example, a multi-air-conditioning apparatus for a building.

BACKGROUND

Air-conditioning apparatuses include an air-conditioning apparatus configured like, for example, a multi-air-conditioning apparatus for a building, such that a heat source unit (outdoor unit) is disposed outside a structure and an indoor unit is disposed in an indoor space in the structure. Refrigerant circulated through a refrigerant circuit included in the air-conditioning apparatus transfers heat to (or removes heat from) air supplied to a heat exchanger in the indoor unit, thus heating or cooling the air. The heated or cooled air is sent to an air-conditioned space, thus performing heating or cooling.

A typical building has a plurality of indoor spaces and such an air-conditioning apparatus accordingly includes a plurality of indoor units. In a large building, refrigerant pipes connecting the outdoor unit to each indoor unit may have a length of 100 m. The longer the pipes connecting the outdoor unit to each indoor unit are, the more the amount of refrigerant with which the refrigerant circuit is filled is needed.

Indoor units of a multi-air-conditioning apparatus for a building are typically installed and used in indoor spaces (e.g., an office space, a living room, and a store) where people stay. Some of refrigerants are flammable and toxic to humans. If such a refrigerant leaks out of any indoor unit disposed in an indoor space for some reasons, the refrigerant may significantly affect human health and cause safety issues. If a refrigerant which is harmless to humans leaks out of any indoor unit, the concentration of oxygen in the indoor space may decrease due to the refrigerant leakage and accordingly affect human health. A method using an air-conditioning apparatus of a two-loop system type including a primary loop through which refrigerant is circulated and a secondary loop through which water or brine that is harmless is circulated for air conditioning in a space where people stay has been proposed to overcome the above-described disadvantages (refer to Patent Literature 1, for example).

In particular, in Patent Literature 1, three-way valves and flow control valves in a heat medium circuit are controlled by a valve control circuit including a microcontroller. The valve control circuit cannot drive a plurality of valve mechanisms at the same time. This circuit transmits drive signals to the valve mechanisms at different times.

PATENT LITERATURE

Patent Literature 1: Japanese Unexamined Patent Application Publication No. 2012-127641

To simultaneously operate the valves for controlling heat medium passages to the indoor units using the valve control circuit having a limited number of input-output ports described in Patent Literature 1, the valve control circuit has to be provided for each valve. Disadvantageously, this results in an increase in cost. In addition, an abnormal condition may occur due to an increase in heat medium pressure caused depending on the relationship between opening of the valves and time of driving of the pumps.

SUMMARY

The present invention has been made to overcome the above-described disadvantages and aims to provide an air-conditioning apparatus capable of controlling a heat medium passage with reduced cost for valve driving.

The present invention provides an air-conditioning apparatus including a refrigerant circuit through which heat source side refrigerant is circulated. The refrigerant circuit includes a compressor, a heat source side heat exchanger, a plurality of expansion devices, refrigerant passages of a plurality of intermediate heat exchangers, and a plurality of refrigerant flow switching devices, which are connected by refrigerant pipes. The refrigerant flow switching devices switch between circulation paths. The air-conditioning apparatus further includes a heat medium circuit through which a heat medium is circulated. The heat medium circuit includes a pump, a plurality of use side heat exchangers, a plurality of heat medium flow switching devices, a plurality of heat medium flow control devices, and heat medium passages of the intermediate heat exchangers, which are connected by heat medium pipes. The air-conditioning apparatus further includes actuation control means configured to perform control in such a manner that the heat medium flow switching device and the heat medium flow control devices connected to one of the use side heat exchangers are opened and, after that, the heat medium flow control device connected to another one of the use side heat exchangers is opened. The actuation control means has a function of controlling the pump in such a manner that a start time of driving of the pump is delayed later than start of actuation of the heat medium flow switching devices and the heat medium flow control devices.

The air-conditioning apparatus according to the present invention achieves a reduction in time required for driving of the pumps and switching of the heat medium passages using a low-cost unit including actuation control means reduced to a minimum while suppressing an increase in pressure of the heat medium.

BRIEF DESCRIPTION OF DRAWINGS

FIG. 1 is a schematic diagram illustrating an example of installation of an air-conditioning apparatus according to Embodiment of the present invention.

FIG. 7A is a graph illustrating an operation of each heat medium flow switching device in FIG. 2.

FIG. 7B is a schematic diagram illustrating operations of the heat medium flow switching devices in FIG. 7A.

FIG. 8A is a graph illustrating an operation of each heat medium flow control device in FIG. 2.

FIG. 8B is a schematic diagram illustrating operations of the heat medium flow control device in FIG. 8A.

FIG. 9 is a table illustrating actuation order of the heat medium flow switching devices and the heat medium flow control devices in the air-conditioning apparatus of FIG. 2 and an example of driving of pumps.

FIG. 10 is a table illustrating the actuation order of the heat medium flow switching devices and the heat medium flow control devices in the air-conditioning apparatus of FIG. 2 and an example of driving of the pumps.

FIG. 11 is a table illustrating the actuation order of the heat medium flow switching devices and the heat medium flow control devices in the air-conditioning apparatus of FIG. 2 and an example of driving of the pumps.

FIG. 12 is a table illustrating the actuation order of the heat medium flow switching devices and the heat medium flow control devices in the air-conditioning apparatus of FIG. 2 and an example of driving of the pumps.

FIG. 13 is a table illustrating the actuation order of the heat medium flow switching devices and the heat medium flow control devices in the air-conditioning apparatus of FIG. 2 and an example of driving of the pumps.

DETAILED DESCRIPTION

Figure 2:
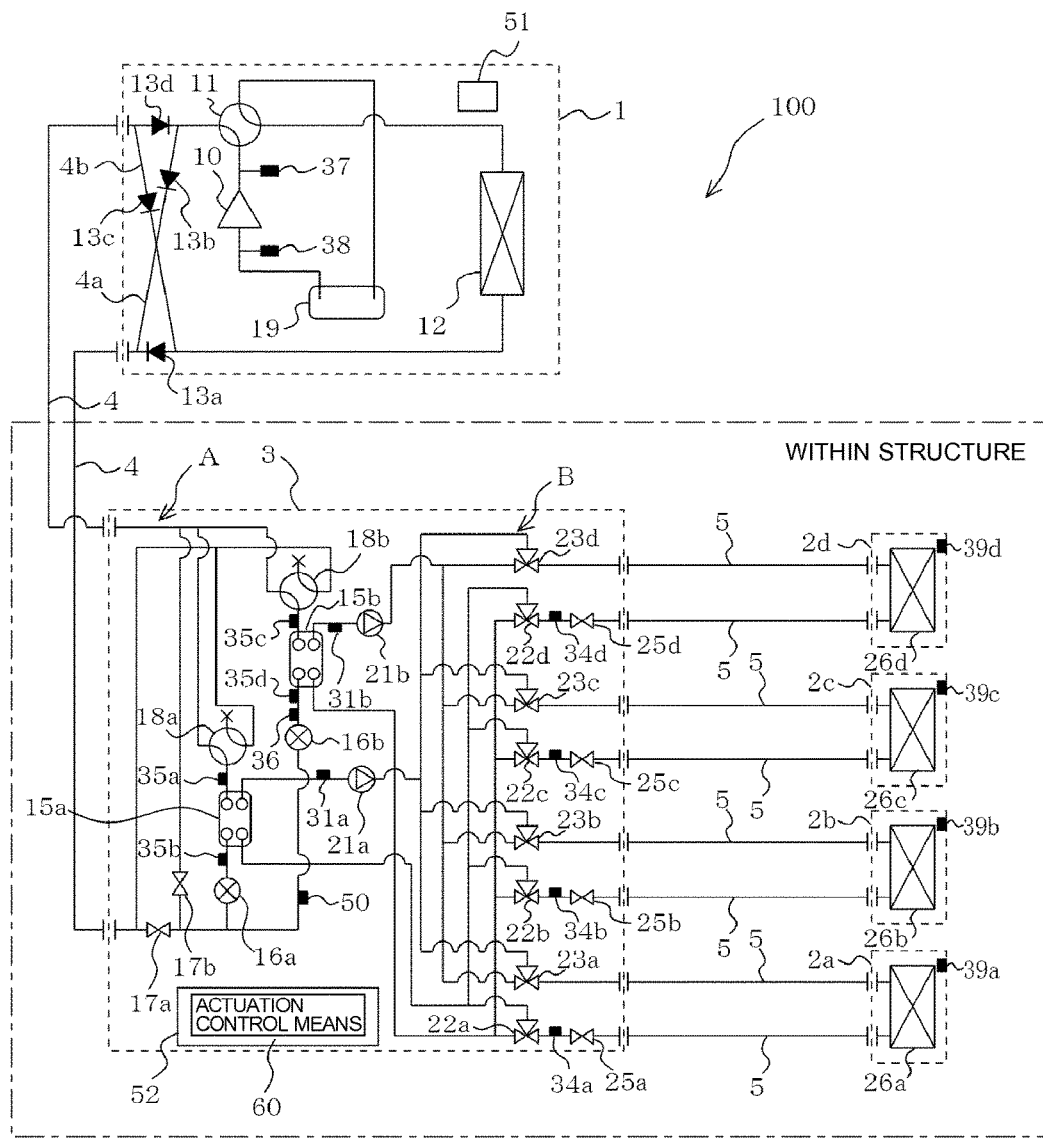
FIG. 2 is a refrigerant circuit diagram illustrating the air-conditioning apparatus according to Embodiment of the present invention.

FIG. 1 is a schematic diagram illustrating an air-conditioning apparatus according to Embodiment of the present invention. An example of installation of an air-conditioning apparatus 100 will be described with reference to FIG. 1. The air-conditioning apparatus 100 includes a refrigeration cycle through which refrigerant is circulated and allows each of indoor units 2a to 2d to freely select a cooling mode or a heating mode as an operation mode. The air-conditioning apparatus 100 includes a refrigerant circuit A (refer to FIG. 2) in which, for example, a single refrigerant, such as R-22, R-32, or R-134a, a near-azeotropic refrigerant mixture, such as R-410A or R-404A, a non-azeotropic refrigerant mixture, such as R-407C, a refrigerant that contains a double bond in its chemical formula and has a relatively low global warming potential, for example, $CF_3CF=CH_2$, a mixture containing the refrigerant, or a natural refrigerant, such as $CO_2$ or propane, is used, and a heat medium circuit B in which a heat medium, such as water, is used.

The air-conditioning apparatus 100 uses a system (indirect system) for using the refrigerant (heat source side refrigerant) in an indirect manner. Specifically, the air-conditioning apparatus 100 conveys cooling energy or heating energy stored in the heat source side refrigerant to refrigerant (hereinafter, referred to as a "heat medium") different from the heat source side refrigerant and cools or heats an air-conditioned space with the cooling energy or heating energy stored in the heat medium. Furthermore, the above-described heat medium is allowed to directly exchange heat with outdoor air, indoor air, or another heat source, for example, heat exhausted from a boiler, so that the heat medium can store cooling energy or heating energy.

The air-conditioning apparatus 100 includes a single outdoor unit 1, serving as a heat source unit, the indoor units 2, a heat medium relay unit 3 interposed between the outdoor unit 1 and the indoor units 2. The heat medium relay unit 3 exchanges heat between the heat source side refrigerant and the heat medium. The outdoor unit 1 is connected to the heat medium relay unit 3 by refrigerant pipes 4 through which the heat source side refrigerant is circulated. The heat medium relay unit 3 is connected to each indoor unit 2 by pipes (heat medium pipes) 5 through which the heat medium is circulated. Cooling energy or heating energy produced in the outdoor unit 1 is delivered to the indoor units 2 via the heat medium relay unit 3.

The outdoor unit 1 is typically disposed in an outdoor space 6 that is a space (e.g., a roof) outside a structure 9, such as a building, and supplies cooling energy or heating energy to the indoor units 2 via the heat medium relay unit 3. Each indoor unit 2 is disposed at a position where the indoor unit 2 can supply cooling air or heating air to an indoor space 7 that is a space (e.g., a living room) inside the structure 9, and supplies the cooling air or the heating air to the indoor space 7, serving as an air-conditioned space.

The heat medium relay unit 3 includes a housing separate from housings of the outdoor unit 1 and the indoor units 2 and is accordingly disposed at a different position from those of the outdoor space 6 and the indoor space 7. The heat medium relay unit 3 is connected to the outdoor unit 1 by the refrigerant pipes 4 and is connected to each indoor unit 2 by the pipes 5. The heat medium relay unit 3 transfers cooling energy or heating energy supplied from the outdoor unit 1 to the indoor unit 2.

In particular, in the air-conditioning apparatus 100, the outdoor unit 1 and the heat medium relay unit 3 are connected using two refrigerant pipes 4 and the heat medium relay unit 3 and each of the indoor units 2a to 2d are connected using two pipes 5. Connecting the units (the outdoor unit 1, the indoor units 2, and the heat medium relay unit 3) using the refrigerant pipes 4 and the pipes 5 in this manner facilitates construction of the air-conditioning apparatus 100.

FIG. 1 illustrates a state as an example where the heat medium relay unit 3 is disposed in a space 8 different from the indoor space 7, for example, a space above a ceiling, inside the structure 9. Alternatively, the heat medium relay unit 3 may be disposed in a common space or the like in which an elevator or the like is installed. Although FIG. 1 illustrates the indoor units 2 of a ceiling cassette type, Embodiment is not limited to this illustration. In other words, the air-conditioning apparatus 100 may be any type capable of sending heating air or cooling air to the indoor space 7 directly or through a duct or the like, for example, a ceiling concealed type or a ceiling suspended type. In addition, the heat medium relay unit 3 may be disposed near the outdoor unit 1.

FIG. 2 is a refrigerant circuit diagram illustrating the air-conditioning apparatus 100 according to Embodiment of the present invention. As illustrated in FIG. 2, the air-conditioning apparatus 100 includes the outdoor unit 1, the indoor units 2a to 2d, and the heat medium relay unit 3. The outdoor unit 1 is connected to the heat medium relay unit 3 by the refrigerant pipes 4 and each of the indoor units 2a to 2d is connected to the heat medium relay unit 3 by the pipes 5.

[Outdoor Unit 1]

The outdoor unit 1 includes a compressor 10 that compresses the refrigerant, a first refrigerant flow switching device 11 including a four-way valve, a heat source side heat exchanger 12 that functions as an evaporator or an condenser, and an accumulator 19, disposed on a suction side of the compressor 10, for storing an excess of refrigerant. The outdoor unit 1 further includes check valves 13a to 13d. The check valves 13a to 13d allow the heat source side refrigerant, allowed to flow into and out of the heat medium relay unit 3, to flow in a constant direction irrespective of an operation requested by any or each of the indoor units 2a to 2d.

The compressor 10 sucks the heat source side refrigerant and compresses the heat source side refrigerant into a high-temperature high-pressure state and may be, for example, a capacity-controllable inverter compressor. The first refrigerant flow switching device 11 switches between a heat source side refrigerant flow direction in a heating operation mode (including a heating only operation mode and a heating main operation mode) and a heat source side refrigerant flow direction in a cooling operation mode (including a cooling only operation mode and a cooling main operation mode). The heat source side heat exchanger 12 functions as an evaporator in the heating operation or functions as a condenser in the cooling operation to exchange heat between the heat source side refrigerant and air supplied from an air-sending device (not illustrated), such as a fan.

In addition, pressure sensors, that is, a second pressure sensor 37 and a third pressure sensor 38 are arranged prior to and after the compressor 10. A flow rate of the refrigerant flowing out of the compressor 10 can be calculated based on a rotation speed of the compressor 10 and values of detection by the pressure sensors 37 and 38. The outdoor unit 1 further includes an outdoor unit control device 51 including a microcontroller or a DSP. The outdoor unit control device 51 controls an operation of the outdoor unit 1, for example, the first refrigerant flow switching device 11, in accordance with the operation mode or the like.

[Indoor Units 2]

The indoor units 2a to 2d include use side heat exchangers 26a to 26d, respectively. Each of the use side heat exchangers 26a to 26d is connected by the pipes 5 to a heat medium flow control device 25 and a second heat medium flow switching device 23 arranged in the heat medium relay unit 3. The use side heat exchangers 26a to 26d each exchange heat between the heat medium and air supplied from an air-sending device (not illustrated), such as a fan, to produce heating air or cooling air to be supplied to the indoor space 7. The indoor units 2a to 2d each include a sucked air temperature sensor 39.

[Heat Medium Relay Unit 3]

The heat medium relay unit 3 includes intermediate heat exchangers 15a and 15b in which the refrigerant exchanges heat with the heat medium, expansion devices 16a and 16b for depressurizing the refrigerant, opening and closing devices 17a and 17b for opening or closing a passage of the refrigerant pipe 4, second refrigerant flow switching devices 18a and 18b for switching between refrigerant passages, pumps 21a and 21b allowing the heat medium to be circulated, heat medium flow switching devices (first heat medium flow switching devices 22a to 22d, each of which is connected to a first pipe of the pipes 5, and second heat medium flow switching devices 23a to 23d, each of which is connected to a second pipe of the pipes 5) for switching between passages for the heat medium flowing through the use side heat exchangers 26a to 26d, and four heat medium flow control devices 25a to 25d, each of which is connected to the first pipe 5 to which the corresponding first heat medium flow switching device 22 is connected.

The intermediate heat exchangers 15a and 15b (also referred to as the "intermediate heat exchangers 15") each function as a condenser (radiator) or an evaporator to exchange heat between the heat source side refrigerant and the heat medium such that cooling energy or heating energy, produced by the outdoor unit 1 and stored in the heat source side refrigerant, is transferred to the heat medium. The intermediate heat exchanger 15a is disposed between the expansion device 16a and the second heat medium flow switching device 18a in the refrigerant circuit A and is used to cool the heat medium in a cooling and heating mixed operation mode. The intermediate heat exchanger 15b is disposed between the expansion device 16b and the second heat medium flow switching device 18b in the refrigerant circuit A and is used to heat the heat medium in the cooling and heating mixed operation mode.

The expansion devices 16a and 16b (also referred to as the "expansion devices 16") each function as a pressure reducing valve or an expansion valve to depressurize the heat source side refrigerant such that the refrigerant is expanded. The expansion device 16a is disposed upstream of the intermediate heat exchanger 15a in the heat source side refrigerant flow direction in the cooling only operation mode. The expansion device 16b is disposed upstream of the intermediate heat exchanger 15b in the heat source side refrigerant flow direction in the cooling only operation mode. Each of the expansion devices 16a and 16b may include a component having a variably controllable opening degree, for example, an electronic expansion valve. Each of the opening and closing devices 17a and 17b includes a two-way valve and opens or closes the refrigerant pipe 4.

Each of the second heat medium flow switching devices 18a and 18b (also referred to as the "second heat medium flow switching devices 18") includes a four-way valve and switches between the heat source side refrigerant flow directions in accordance with the operation mode. The second refrigerant flow switching device 18a is disposed downstream of the intermediate heat exchanger 15a in the heat source side refrigerant flow direction in the cooling only operation mode. The second refrigerant flow switching device 18b is disposed downstream of the intermediate heat exchanger 15b in the heat source side refrigerant flow direction in the cooling only operation mode.

The pumps 21a and 21b (also referred to as the "pumps 21") each allow the heat medium in the pipe 5 to be circulated. The pump 21a is disposed in the pipe 5 located between the intermediate heat exchanger 15a and the second heat medium flow switching devices 23. The pump 21b is disposed in the pipe 5 located between the intermediate heat exchanger 15b and the second heat medium flow switching devices 23. Each of the pumps 21a and 21b may be, for example, a capacity-controllable pump. Although the pumps 21a and 21b are arranged in the pipes 5 so that the refrigerant flows from the intermediate heat exchangers 15a and 15b to the second heat medium flow switching devices 23a to 23d, the pumps 21a and 21b may be arranged so that the refrigerant flows from the first heat medium flow switching devices 22a to 22d to the intermediate heat exchanger 15a.

The heat medium flow switching devices include the first heat medium flow switching devices 22a to 22d connected to the first pipes 5 and the second heat medium flow switching devices 23a to 23d connected to the second pipes 5. Each of the first heat medium flow switching devices 22a to 22d (also referred to as the "first heat medium flow switching devices 22") includes a three-way valve and switches between passages for the heat medium flowing from the corresponding one of the use side heat exchangers 26a to 26d. The first heat medium flow switching devices 22 equal in number to the (four in FIG. 2) indoor units 2a to 2d (use side heat exchangers 26a to 26d) installed are arranged. Each first heat medium flow switching device 22 is disposed on an outlet side of a heat medium passage (the pipe 5) of the corresponding one of the use side heat exchangers 26a to 26d such that one of three ways is connected to the intermediate heat exchanger 15a, another one of the three ways is connected to the intermediate heat exchanger 15b, and the other one of the three ways is connected to the heat medium flow control device 25.

Each of the second heat medium flow switching devices 23a to 23d (also referred to as the "second heat medium flow switching devices 23") includes a three-way valve and switches between passages for the heat medium flowing to the corresponding one of the use side heat exchangers 26a to 26d. The second heat medium flow switching devices 23 equal in number to the (four in FIG. 2) indoor units 2 installed are arranged. Each second heat medium flow switching device 23 is disposed on an inlet side of the heat medium passage (the pipe 5) of the corresponding one of the use side heat exchangers 26a to 26d such that one of three ways is connected to the intermediate heat exchanger 15a, another one of the three ways is connected to the intermediate heat exchanger 15b, and the other one of the three ways is connected to the corresponding one of the use side heat exchangers 26a to 26d. The second heat medium flow switching devices 23a, 23b, 23c, and 23d are illustrated in that order from the bottom in FIG. 2 so as to correspond to the use side heat exchangers 26a to 26d, respectively.

Each of the heat medium flow control devices 25a to 25d (also referred to as the "heat medium flow control devices 25") includes a two-way valve capable of controlling the opening area and controls a flow rate of the heat medium flowing through the pipe 5 in accordance with a flow rate required to provide an air conditioning load needed in an indoor space. The heat medium flow control devices 25 equal in number to the (four in this case) indoor units 2 installed are arranged. Each heat medium flow control device 25 is disposed on the outlet side of the heat medium passage of the corresponding use side heat exchanger 26 such that one way is connected to the use side heat exchanger 26 and the other way is connected to the first heat medium flow switching device 22. The heat medium flow control devices 25a, 25b, 25c, and 25d are illustrated in that order from the bottom in FIG. 2 so as to correspond to the use side heat exchangers 26a to 26d, respectively. Although FIG. 2 illustrates the heat medium flow control devices 25a, 25b, 25c, and 25d arranged in the heat medium relay unit 3, more heat medium flow control devices 25 may be arranged. The heat medium flow control device 25 may be disposed on the inlet side of the heat medium passage of each use side heat exchanger 26.

The pipes 5 are used to circulate the heat medium between the intermediate heat exchangers 15a and 15b and the use side heat exchangers 26a to 26d. Each of the pipes 5 branches into pipes (four pipes in this case) equal in number to the indoor units 2a to 2d connected to the heat medium relay unit 3. The pipes 5 include the pipes connected to the intermediate heat exchanger 15a and the pipes connected to the intermediate heat exchanger 15b. The pipes 5 are connected by the first heat medium flow switching devices 22 and the second heat medium flow switching devices 23. Whether the heat medium flowing from the intermediate heat exchanger 15a is allowed to flow into the use side heat exchanger 26 or the heat medium flowing from the intermediate heat exchanger 15b is allowed to flow into the use side heat exchanger 26 is determined by controlling the corresponding first heat medium flow switching device 22 and the corresponding second heat medium flow switching device 23.

The heat medium relay unit 3 includes first temperature sensors 31a and 31b, second temperature sensors 34a to 34d, third temperature sensors 35a to 35d, a fourth temperature sensor 50, and a first pressure sensor 36. Each of the first temperature sensors 31a and 31b (also referred to as the "first temperature sensors 31") is, for example, a thermistor and detects a temperature of the heat medium flowing out of the corresponding intermediate heat exchanger 15, that is, the heat medium at an outlet of the intermediate heat exchanger 15. The first temperature sensor 31a is disposed in the pipe 5 on an inlet side of the pump 21a. The first temperature sensor 31b is disposed in the pipe 5 on an inlet side of the pump 21b.

Each of the second temperature sensors 34a to 34d (also referred to as the "second temperature sensors 34") is, for example, a thermistor and detects the temperature of the heat medium flowing out of the corresponding use side heat exchanger 26. Each second temperature sensor 34 is disposed between the corresponding first heat medium flow switching device 22 and the corresponding heat medium flow control device 25. The second temperature sensors 34 equal in number to the (four in this case) indoor units 2 installed are arranged. The second temperature sensors 34a, 34b, 34c, and 34d are illustrated in that order from the bottom in FIG. 2 so as to correspond to the indoor units 2a to 2d, respectively.

Each of the third temperature sensors 35a to 35d (also referred to as the "third temperature sensors 35") is, for example, a thermistor and detects a temperature of the heat source side refrigerant flowing into or out of the corresponding intermediate heat exchanger 15. The third temperature sensor 35a is disposed between the intermediate heat exchanger 15a and the second heat medium flow switching device 18a. The third temperature sensor 35b is disposed between the intermediate heat exchanger 15a and the expansion device 16a. The third temperature sensor 35c is disposed between the intermediate heat exchanger 15b and the second heat medium flow switching device 18b. The third temperature sensor 35d is disposed between the intermediate heat exchanger 15b and the expansion device 16b.

The fourth temperature sensor 50 for obtaining temperature information to be used to calculate an evaporating temperature and a dew-point temperature is disposed between the expansion device 16a and the expansion device 16b. Refrigerant at the fourth temperature sensor 50 is liquid refrigerant. A heat medium relay unit control device 52 calculates a liquid inlet enthalpy based on this temperature information. When the temperature of the refrigerant in a low-pressure two-phase warm state is detected by the third temperature sensor 35d, the heat medium relay unit control device 52 calculates a saturated liquid enthalpy and a saturated gas enthalpy based on this temperature information.

The heat medium relay unit 3 includes the heat medium relay unit control device 52 including, for example, a microcontroller or a DSP. Information (e.g., temperature information and pressure information) detected by the above-described detecting means is transmitted to the heat medium relay unit control device 52. The information is further transmitted from the heat medium relay unit control device 52 to centralized control means (not illustrated) for controlling the entire air-conditioning apparatus 100 in a centralized manner. The centralized control means determines driving of the pumps 21, an opening degree of each expansion device 16, opening or closing of each opening and closing device 17, switching of the second heat medium flow switching devices 18, switching of the first heat medium flow switching devices 22, switching of the second heat medium flow switching devices 23, and an opening degree of each heat medium flow control device 25 in accordance with information detected by the above-described detecting means and an instruction from a remote control. The heat medium relay unit control device 52 outputs drive signals to the first heat medium flow switching devices 22, the second heat medium flow switching devices 23, and the heat medium flow control devices 25 determined by the centralized control means and controls operations of those devices.

The outdoor unit control device 51 controls an operation of the outdoor unit 1 based on information transmitted from the heat medium relay unit control device 52. For example, the outdoor unit control device 51 calculates an evaporating temperature, a condensing temperature, a saturation temperature, the degree of superheat, and the degree of subcooling based on calculations obtained by the heat medium relay unit control device 52. The outdoor unit control device 51 controls, for example, a rotation speed and a driving frequency of the compressor 10, switching of the first refrigerant flow switching device 11, and the rate (including ON/OFF) of the fan in the heat source side heat exchanger 12 so that the air-conditioning apparatus 100 provides its maximum performance. Although the outdoor unit control device 51, the heat medium relay unit control device 52, and the centralized control means have been described as different components, those control devices and means may be included in the same unit.

[Description of Operation Modes]

The air-conditioning apparatus 100 includes the refrigerant circuit A including the compressor 10, the first refrigerant flow switching device 11, the heat source side heat exchanger 12, the opening and closing devices 17a and 17b, the second refrigerant flow switching devices 18a and 18b, refrigerant passages of the intermediate heat exchangers 15, the expansion devices 16, and the accumulator 19 connected by the refrigerant pipes 4. The air-conditioning apparatus 100 further includes a heat medium circuit B including heat medium passages of the intermediate heat exchangers 15, the pumps 21, the first heat medium flow switching devices 22, the heat medium flow control devices 25, the use side heat exchangers 26, and the second heat medium flow switching devices 23 connected by the pipes 5. Specifically, the use side heat exchangers 26 are connected in parallel with each of the intermediate heat exchangers 15a and 15b, thus providing a plurality of heat medium circuits B.

In the air-conditioning apparatus 100, therefore, the outdoor unit 1 is connected to the heat medium relay unit 3 via the intermediate heat exchangers 15a and 15b arranged in the heat medium relay unit 3 and the heat medium relay unit 3 is connected to the indoor units 2a to 2d via the intermediate heat exchangers 15a and 15b. The intermediate heat exchangers 15a and 15b allow the heat source side refrigerant circulated through the refrigerant circuit A to exchange heat with the heat medium circulated through the heat medium circuits B.

The operation modes performed by the air-conditioning apparatus 100 will now be described. The air-conditioning apparatus 100 enables the indoor units 2a to 2d, on the basis of instructions from the indoor units 2a to 2d, to perform the cooling operation or the heating operation. Specifically, the air-conditioning apparatus 100 enables all of the indoor units 2a to 2d to perform the same operation and also enables the indoor units 2a to 2d to perform different operations.

The operation modes performed by the air-conditioning apparatus 100 includes the cooling only operation mode in which all of the operating indoor units 2a to 2d perform the cooling operation, the heating only operation mode in which all of the operating indoor units 2a to 2d perform the heating operation, the cooling main operation mode in which a cooling load is larger, and a heating main operation mode in which a heating load is larger. The cooling main operation mode and the heating main operation mode are included in the cooling and heating mixed operation mode. The operation modes will be described below in accordance with the flow of the heat source side refrigerant and the flow of the heat medium.

[Cooling Only Operation Mode]

Figure 3:
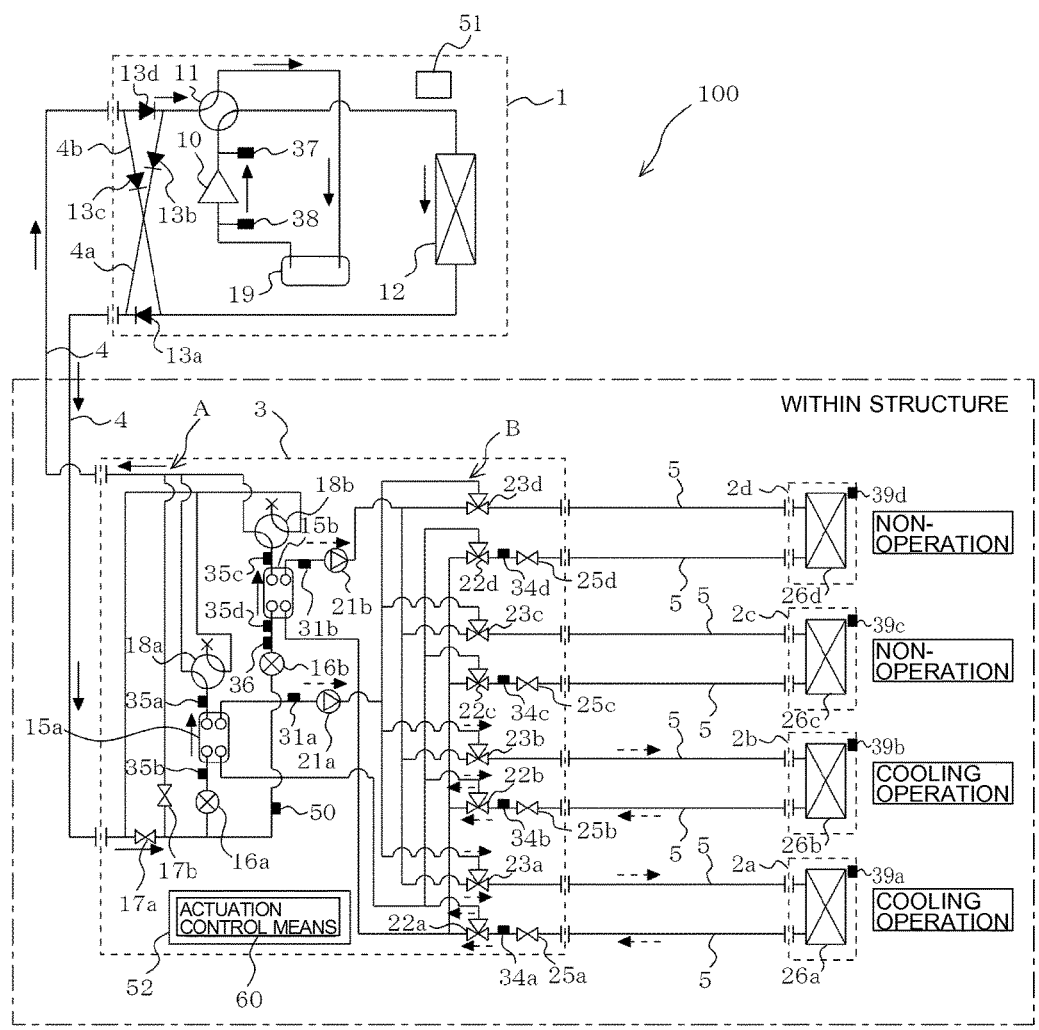
FIG. 3 is a refrigerant circuit diagram illustrating flows of the refrigerant in a cooling only operation mode of the air-conditioning apparatus of FIG. 2.

FIG. 3 is a refrigerant circuit diagram illustrating the flows of the refrigerant in the cooling only operation mode of the air-conditioning apparatus 100 of FIG. 2. The cooling only operation mode will be described on the assumption that, for example, a cooling load is generated in the indoor units 2a to 2d including the use side heat exchangers 26a and 26b in FIG. 3. In FIG. 3, solid-line arrows indicate the heat source side refrigerant flow direction and broken-line arrows indicate a heat medium flow direction. FIG. 3 illustrates a case where the use side heat exchangers 26a and 26b are in operation and the use side heat exchangers 26c and 26d are in non-operation.

In this mode, in the outdoor unit 1, the first refrigerant flow switching device 11 is switched so that the heat source side refrigerant discharged from the compressor 10 flows into the heat source side heat exchanger 12. In the heat medium relay unit 3, the second refrigerant flow switching devices 18a and 18b are switched so as to connect the intermediate heat exchangers 15a and 15b to the refrigerant pipes 4 (low-pressure pipes). The heat medium flow control devices 25a and 25b corresponding to the indoor units 2a and 2b which perform the cooling operation are controlled to be opened and the heat medium flow control devices 25c and 25d corresponding to the indoor units 2c and 2d which do not perform the cooling operation are controlled to be closed. The pumps 21a and 21b are driven, so that the heat medium is circulated between the intermediate heat exchangers 15a and 15b and the use side heat exchangers 26a and 26b.

First, the flow of the heat source side refrigerant in the refrigerant circuit A will be described. Low-temperature low-pressure refrigerant is compressed into high-temperature high-pressure gas refrigerant by the compressor 10 and is then discharged therefrom. The high-temperature high-pressure gas refrigerant discharged from the compressor 10 passes through the first refrigerant flow switching device 11 and flows into the heat source side heat exchanger 12. In the heat source side heat exchanger 12, the refrigerant transfers heat to outdoor air and thus turns into high pressure liquid refrigerant. The high pressure refrigerant leaving the heat source side heat exchanger 12 passes through the check valve 13a, flows out of the outdoor unit 1, passes through the refrigerant pipe 4, and flows into the heat medium relay unit 3. The high pressure refrigerant, which has flowed into the heat medium relay unit 3, passes through the opening and closing device 17a and is then divided into a stream to the expansion device 16a and a stream to the expansion device 16b. The refrigerant is expanded into low-temperature low-pressure two-phase refrigerant by each of the expansion devices 16a and 16b. The opening and closing device 17b is closed.

The streams of the two-phase refrigerant flow into the intermediate heat exchangers 15a and 15b, each acting as an evaporator, remove heat from the heat medium circulated through the heat medium circuits B, so that the refrigerant cools the heat medium and turns into low-temperature low-pressure gas refrigerant. The gas refrigerant leaving the intermediate heat exchangers 15a and 15b passes through the second refrigerant flow switching devices 18a and 18b, flows out of the heat medium relay unit 3, passes through the refrigerant pipe 4, and again flows into the outdoor unit 1. The refrigerant, which has flowed into the outdoor unit 1, passes through the check valve 13d, the first refrigerant flow switching device 11, and the accumulator 19, and is then again sucked into the compressor 10.

In this mode, the opening degree of the expansion device 16a is controlled to provide a constant superheat (degree of superheat). The degree of superheat is obtained as the difference between a temperature detected by the third temperature sensor 35a and a temperature detected by the third temperature sensor 35b. Similarly, the opening degree of the expansion device 16b is controlled to provide a constant superheat, which is obtained as the difference between a temperature detected by the third temperature sensor 35c and a temperature detected by the third temperature sensor 35d.

Next, the flow of the heat medium in the heat medium circuits B will be described. In the cooling only operation mode, both the intermediate heat exchanger 15a and the intermediate heat exchanger 15b transfer cooling energy of the heat source side refrigerant to the heat medium. The pumps 21a and 21b allow the cooled heat medium to flow through the pipes 5. The heat medium, pressurized by the pumps 21a and 21b, leaving the pumps 21a and 21b passes through the second heat medium flow switching devices 23a and 23b and flows into the use side heat exchangers 26a and 26b. In each of the use side heat exchangers 26a and 26b, the heat medium removes heat from indoor air to cool the indoor space 7.

Then, the heat medium flows out of each of the use side heat exchangers 26a and 26b and flows into the corresponding one of the heat medium flow control devices 25a and 25b. At this time, each of the heat medium flow control devices 25a and 25b allows the heat medium to be controlled at a flow rate necessary to provide an air conditioning load needed in the indoor space, such that the controlled flow rate of heat medium flows into the corresponding one of the use side heat exchangers 26a and 26b. The heat medium leaving the heat medium flow control devices 25a and 25b passes through the first heat medium flow switching devices 22a and 22b, flows into the intermediate heat exchangers 15a and 15b, and is then again sucked into the pumps 21a and 21b.

In the pipe 5 in each of the use side heat exchangers 26a and 26b, the heat medium flows in the direction in which the heat medium flows from the second heat medium flow switching device 23 through the heat medium flow control device 25 to the first heat medium flow switching device 22. Note that the air conditioning load needed in each indoor space 7 can be provided by controlling the difference between a temperature detected by the first temperature sensor 31a or a temperature detected by the first temperature sensor 31b and a temperature detected by the corresponding one of the second temperature sensors 34a and 34b at a target value. As regards a temperature at the outlet of each intermediate heat exchanger 15, either of the temperature detected by the first temperature sensor 31a and the temperature detected by the first temperature sensor 31b may be used. Alternatively, the mean temperature of them may be used. In this case, the first heat medium flow switching devices 22 and the second heat medium flow switching devices 23 are allowed to have an intermediate opening degree so that passages to both the intermediate heat exchanger 15a and the intermediate heat exchanger 15b are secured.

[Heating Only Operation Mode]

Figure 4:
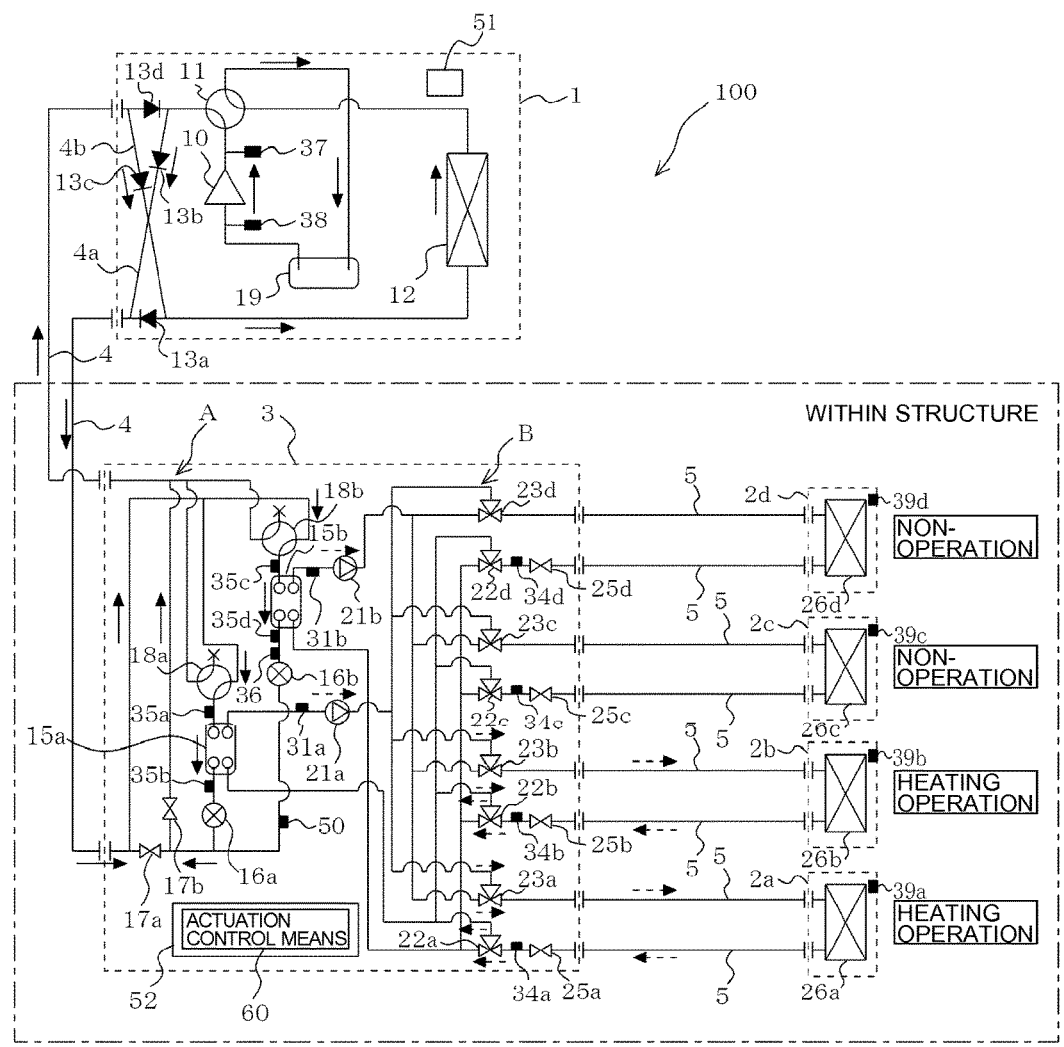
FIG. 4 is a refrigerant circuit diagram illustrating flows of the refrigerant in a heating only operation mode of the air-conditioning apparatus of FIG. 2.

FIG. 4 is a refrigerant circuit diagram illustrating the flows of the refrigerant in the heating only operation mode of the air-conditioning apparatus 100 of FIG. 2. The heating only operation mode will be described on the assumption that, for example, a heating load is generated in the use side heat exchangers 26a and 26b in FIG. 4. In FIG. 4, solid-line arrows indicate the heat source side refrigerant flow direction and broken-line arrows indicate the heat medium flow direction. FIG. 4 illustrates a case where the use side heat exchangers 26a and 26b are in operation and the use side heat exchangers 26c and 26d are in non-operation.

In the heating only operation mode illustrated in FIG. 4, in the outdoor unit 1, the first refrigerant flow switching device 11 is switched so that the heat source side refrigerant discharged from the compressor 10 flows into the heat medium relay unit 3 without passing through the heat source side heat exchanger 12. In the heat medium relay unit 3, the second heat medium flow switching devices 18a and 18b are allowed to communicate with high-pressure pipes. The heat medium flow control devices 25a and 25b are opened and the heat medium flow control devices 25c and 25d are closed. The pumps 21a and 21b are driven, so that the heat medium is circulated between the intermediate heat exchangers 15a and 15b and the use side heat exchangers 26a and 26b.

First, the flow of the heat source side refrigerant in the refrigerant circuit A will be described. Low-temperature low-pressure refrigerant is compressed into high-temperature high-pressure gas refrigerant by the compressor 10 and is then discharged therefrom. The high-temperature high-pressure gas refrigerant discharged from the compressor 10 passes through the first refrigerant flow switching device 11 and the check valve 13b and flows out of the outdoor unit 1. The high-temperature high-pressure gas refrigerant leaving the outdoor unit 1 passes through the refrigerant pipe 4 and flows into the heat medium relay unit 3. The high-temperature high-pressure gas refrigerant, which has flowed into the heat medium relay unit 3, is divided into streams. The streams pass through the second refrigerant flow switching devices 18a and 18b and then flow into the intermediate heat exchangers 15a and 15b, respectively.

The streams of the high-temperature high-pressure gas refrigerant, which have flowed into the intermediate heat exchangers 15a and 15b, transfer heat to the heat medium circulated through the heat medium circuits B, so that the refrigerant turns into high pressure liquid refrigerant. The liquid refrigerant leaving each of the intermediate heat exchangers 15a and 15b is throttled by the corresponding one of the expansion devices 16a and 16b, so that the refrigerant turns into low-temperature low-pressure two-phase refrigerant. The two-phase refrigerant passes through the opening and closing device 17b, flows out of the heat medium relay unit 3, passes through the refrigerant pipe 4, and then flows into the outdoor unit 1. The opening and closing device 17a is closed.

The refrigerant, which has flowed into the outdoor unit 1, passes through the check valve 13c and flows into the heat source side heat exchanger 12, acting as an evaporator. The refrigerant, which has flowed into the heat source side heat exchanger 12, removes heat from the outdoor air in the heat source side heat exchanger 12, so that the refrigerant turns into low-temperature low-pressure gas refrigerant. The low-temperature low-pressure gas refrigerant leaving the heat source side heat exchanger 12 passes through the first refrigerant flow switching device 11 and the accumulator 19 and is then again sucked into the compressor 10.

In this mode, the opening degree of the expansion device 16a is controlled to provide a constant subcooling (degree of subcooling). The degree of subcooling is obtained as the difference between a saturation temperature converted from a pressure detected by the first pressure sensor 36 and a temperature detected by the third temperature sensor 35b. Similarly, the opening degree of the expansion device 16b is controlled to provide a constant subcooling, which is obtained as the difference between the saturation temperature converted from the pressure detected by the first pressure sensor 36 and a temperature detected by the third temperature sensor 35d. If a temperature at the middle position of each intermediate heat exchanger 15 can be measured, the temperature at the middle position may be used instead of the first pressure sensor 36. In this case, such a system can be constructed inexpensively.

Next, the flow of the heat medium in the heat medium circuits B will be described. In the heating only operation mode, both the intermediate heat exchanger 15a and the intermediate heat exchanger 15b transfer heating energy of the heat source side refrigerant to the heat medium and the pumps 21a and 21b allow the heated heat medium to flow through the pipes 5. The heat medium, pressurized by the pumps 21a and 21b, leaving the pumps 21a and 21b passes through the second heat medium flow switching devices 23a and 23b and flows into the use side heat exchangers 26a and 26b. The heat medium transfers heat to the indoor air in each of the use side heat exchangers 26a and 26b, thus heating the indoor space 7.

Then, the heat medium flows out of each of the use side heat exchangers 26a and 26b and flows into the corresponding one of the heat medium flow control devices 25a and 25b. At this time, each of the heat medium flow control devices 25a and 25b allows the heat medium to be controlled at a flow rate necessary to provide an air conditioning load needed in the indoor space, such that the controlled flow rate of heat medium flows into the corresponding one of the use side heat exchangers 26a and 26b. The heat medium leaving the heat medium flow control devices 25a and 25b passes through the first heat medium flow switching devices 22a and 22b, flows into the intermediate heat exchangers 15a and 15b, and is then again sucked into the pumps 21a and 21b.

In the pipe 5 in each of the use side heat exchangers 26a and 26b, the heat medium flows in the direction in which the heat medium flows from the corresponding one of the second heat medium flow switching devices 23a and 23b through the corresponding one of the heat medium flow control devices 25a and 25b to the first heat medium flow switching device 22. Note that the air conditioning load needed in each indoor space 7 can be provided by controlling the difference between a temperature detected by the first temperature sensor 31a or a temperature detected by the first temperature sensor 31b and a temperature detected by the corresponding one of the second temperature sensors 34a and 34b at a target value. As regards a temperature at the outlet of each intermediate heat exchanger 15, either of the temperature detected by the first temperature sensor 31a and the temperature detected by the first temperature sensor 31b may be used. Alternatively, the mean temperature of them may be used.

In this case, the first heat medium flow switching devices 22a and 22b and the second heat medium flow switching devices 23a and 23b are allowed to have an intermediate opening degree so that the passages to both the intermediate heat exchanger 15a and the intermediate heat exchanger 15b are secured. The use side heat exchangers 26a and 26b should be controlled on the basis of the difference between a temperature at the inlet of the use side heat exchanger 26 and a temperature at the outlet thereof. The temperature of the heat medium on the inlet side of each of the use side heat exchangers 26a and 26b is substantially the same as the temperature detected by the first temperature sensor 31b. The use of the first temperature sensor 31b results in a reduction in the number of temperature sensors. Thus, the system can be constructed inexpensively.

[Cooling Main Operation Mode]

Figure 5:
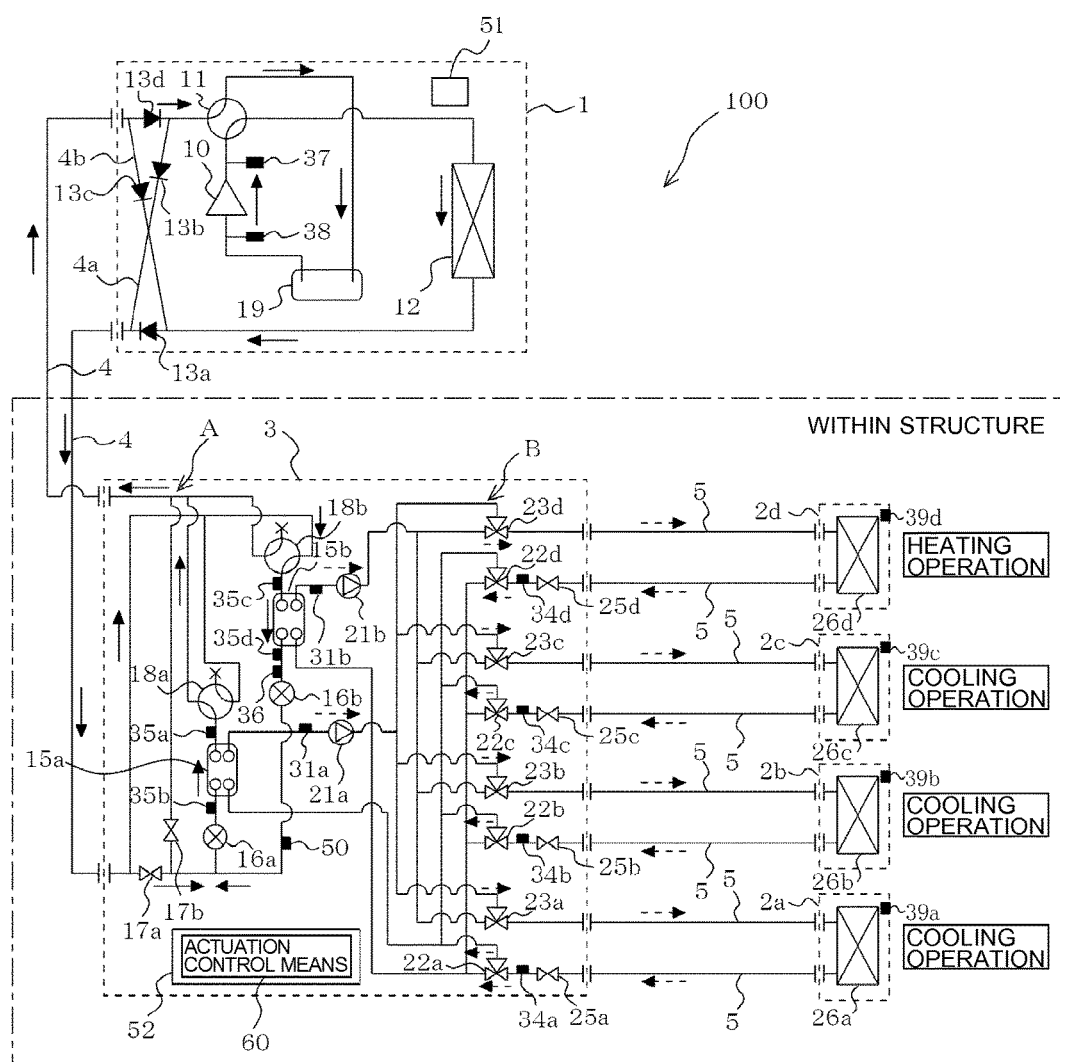
FIG. 5 is a refrigerant circuit diagram illustrating flows of the refrigerant in a cooling main operation mode of the air-conditioning apparatus of FIG. 2.

FIG. 5 is a refrigerant circuit diagram illustrating the flows of the refrigerant in the cooling main operation mode of the air-conditioning apparatus 100 of FIG. 2. The cooling main operation mode will be described on the assumption that, for example, a heating load is generated in the use side heat exchanger 26d and a cooling load is generated in the use side heat exchangers 26a to 26c in FIG. 5. In FIG. 5, solid-line arrows indicate the heat source side refrigerant flow direction and broken-line arrows indicate the heat medium flow direction.

In this mode, in the outdoor unit 1, the first refrigerant flow switching device 11 is switched so that the heat source side refrigerant discharged from the compressor 10 flows into the heat source side heat exchanger 12. In the heat medium relay unit 3, the second heat medium flow switching device 18a is allowed to communicate with low-pressure pipes and the second heat medium flow switching device 18b is allowed to communicate with high-pressure pipes. The heat medium flow control devices 25a to 25d are opened. The pumps 21a and 21 b are driven, so that the heat medium is circulated between the intermediate heat exchanger 15a and the use side heat exchangers 26a to 26c and the heat medium is circulated between the intermediate heat exchanger 15b and the use side heat exchanger 26d.

First, the flow of the heat source side refrigerant in the refrigerant circuit A will be described. Low-temperature low-pressure refrigerant is compressed into high-temperature high-pressure gas refrigerant by the compressor 10 and is then discharged therefrom. The high-temperature high-pressure gas refrigerant discharged from the compressor 10 passes through the first refrigerant flow switching device 11 and flows into the heat source side heat exchanger 12. In the heat source side heat exchanger 12, the high-temperature high-pressure gas refrigerant transfers heat to the outdoor air and thus turns into liquid refrigerant. The refrigerant leaving the heat source side heat exchanger 12 flows out of the outdoor unit 1, passes through the check valve 13a and the refrigerant pipe 4, and flows into the heat medium relay unit 3. The refrigerant, which has flowed into the heat medium relay unit 3, passes through the second heat medium flow switching device 18b and flows into the intermediate heat exchanger 15b, acting as a condenser.

The refrigerant, which has flowed into the intermediate heat exchanger 15b, transfers heat to the heat medium circulated through the heat medium circuit B and thus turns into lower temperature refrigerant. The refrigerant leaving the intermediate heat exchanger 15b is expanded into low-pressure two-phase refrigerant by the expansion device 16b. The low-pressure two-phase refrigerant flows through the expansion device 16a into the intermediate heat exchanger 15a, acting as an evaporator. The low-pressure two-phase refrigerant, which has flowed into the intermediate heat exchanger 15a, removes heat from the heat medium circulated through the heat medium circuits B, so that the refrigerant cools the heat medium and turns into low pressure gas refrigerant. The gas refrigerant flows out of the intermediate heat exchanger 15a, passes through the second heat medium flow switching device 18a, flows out of the heat medium relay unit 3, passes through the refrigerant pipe 4, and again flows into the outdoor unit 1. The refrigerant, which has flowed into the outdoor unit 1, passes through the check valve 13d, the first refrigerant flow switching device 11, and the accumulator 19 and is then again sucked into the compressor 10.

In this mode, the expansion device 16a is fully opened and the opening and closing device 17b is closed. Furthermore, the opening degree of the expansion device 16b is controlled to provide a constant superheat, which is obtained as the difference between a temperature detected by the third temperature sensor 35a and a temperature detected by the third temperature sensor 35b. Alternatively, the opening degree of the expansion device 16b may be controlled to provide a constant subcooling, which is obtained as the difference between a saturation temperature converted from a pressure detected by the first pressure sensor 36 and a temperature detected by the third temperature sensor 35d. In addition, the expansion device 16b may be fully opened and the superheat or subcooling may be controlled through the expansion device 16a.

Next, the flow of the heat medium in the heat medium circuits B will be described. In the cooling main operation mode, the intermediate heat exchanger 15a transfers cooling energy of the heat source side refrigerant to the heat medium and the pump 21a allows the cooled heat medium to flow through the pipes 5. In addition, the intermediate heat exchanger 15b transfers heating energy of the heat source side refrigerant to the heat medium and the pump 21b allows the heated heat medium to flow through the pipes 5.

In each of the use side heat exchangers 26a to 26c, the heat medium removes heat from the indoor air, thus cooling the indoor space 7. In the use side heat exchanger 26d, the heat medium transfers heat to the indoor air, thus heating the indoor space 7. At this time, each of the heat medium flow control devices 25a to 25d allows the heat medium to be controlled at a flow rate necessary to provide an air conditioning load needed in the indoor space, such that the controlled flow rate of heat medium flows into the corresponding one of the use side heat exchangers 26a to 26d. The heat medium, which has passed through the use side heat exchanger 26d and has slightly decreased in temperature, passes through the heat medium flow control device 25d and the first heat medium flow switching device 22d, flows into the intermediate heat exchanger 15b, and is then again sucked into the pump 21b. The heat medium, which has passed through each of the use side heat exchangers 26a to 26c and has slightly increased in temperature, passes through the corresponding one of the heat medium flow control devices 25a to 25c and the corresponding one of the first heat medium flow switching devices 22a to 22c, flows into the intermediate heat exchanger 15a, and is then again sucked into the pump 21a.

Throughout this mode, the first heat medium flow switching devices 22a to 22d and the second heat medium flow switching devices 23a to 23d allow the cold heat medium and the warm heat medium to be introduced to the use side heat exchangers 26a to 26d, each having the cooling load or the heating load, without mixing with each other. In the pipe 5 in each of the use side heat exchangers 26a to 26d, each of which is used for cooling or heating, the heat medium flows in the direction in which it flows from the corresponding one of the second heat medium flow switching devices 23a to 23d through the corresponding one of the heat medium flow control devices 25a to 25d to the corresponding one of the first heat medium flow switching devices 22a to 22d. Note that the air conditioning load needed in the indoor space 7 to be heated can be provided by controlling the difference between a temperature detected by the first temperature sensor 31b and a temperature detected by the second temperature sensor 34 at a target value, and the air conditioning load needed in each indoor space 7 to be cooled can be provided by controlling the difference between a temperature detected by the corresponding second temperature sensor 34 and a temperature detected by the first temperature sensor 31a at a target value.

[Heating Main Operation Mode]

Figure 6:
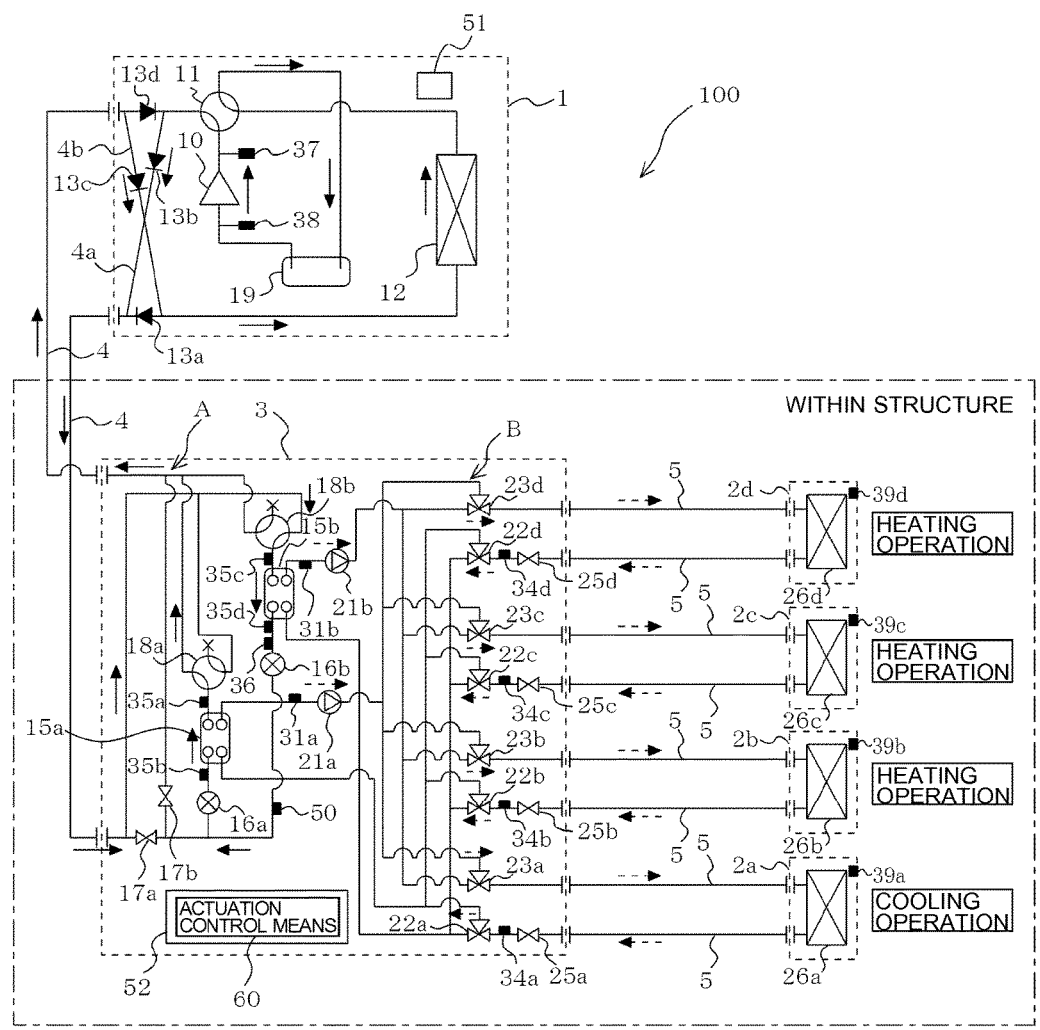
FIG. 6 is a refrigerant circuit diagram illustrating flows of the refrigerant in a heating main operation mode of the air-conditioning apparatus of FIG. 2.

FIG. 6 is a refrigerant circuit diagram illustrating the flows of the refrigerant in the heating main operation mode of the air-conditioning apparatus 100 of FIG. 2. The heating main operation mode will be described on the assumption that, for example, a heating load is generated in the use side heat exchangers 26b to 26d and a cooling load is generated in the use side heat exchanger 26a in FIG. 6. In FIG. 6, solid-line arrows indicate the heat source side refrigerant flow direction and broken-line arrows indicate the heat medium flow direction.

In this mode, in the outdoor unit 1, the first refrigerant flow switching device 11 is switched so that the heat source side refrigerant discharged from the compressor 10 flows into the heat medium relay unit 3 without passing through the heat source side heat exchanger 12. In the heat medium relay unit 3, the second heat medium flow switching device 18a is allowed to communicate with low-pressure pipes and the second heat medium flow switching device 18b is allowed to communicate with high-pressure pipes. The heat medium flow control devices 25a to 25d are opened and the pumps 21a and 21b are driven, so that the heat medium is circulated between the intermediate heat exchanger 15a and the use side heat exchanger 26a and the heat medium is circulated between the intermediate heat exchanger 15b and the use side heat exchangers 26b and 26c.

First, the flow of the heat source side refrigerant in the refrigerant circuit A will be described. Low-temperature low-pressure refrigerant is compressed into high-temperature high-pressure gas refrigerant by the compressor 10 and is then discharged therefrom. The high-temperature high-pressure gas refrigerant discharged from the compressor 10 passes through the first refrigerant flow switching device 11 and the check valve 13b and flows out of the outdoor unit 1. The high-temperature high-pressure gas refrigerant leaving the outdoor unit 1 passes through the refrigerant pipe 4 and flows into the heat medium relay unit 3. The high-temperature high-pressure gas refrigerant, which has flowed into the heat medium relay unit 3, passes through the second heat medium flow switching device 18b and flows into the intermediate heat exchanger 15b, acting as a condenser.

The gas refrigerant, which has flowed into the intermediate heat exchanger 15b, transfers heat to the heat medium circulated through the heat medium circuits B and thus turns into liquid refrigerant. The refrigerant leaving the intermediate heat exchanger 15b is throttled into low-pressure two-phase refrigerant by the expansion valve 16b. The low-pressure two-phase refrigerant flows through the expansion device 16a into the intermediate heat exchanger 15a, acting as an evaporator. The low-pressure two-phase refrigerant, which has flowed into the intermediate heat exchanger 15a, evaporates by removing heat from the heat medium circulated through the heat medium circuit B, thus cooling the heat medium. The low-pressure two-phase refrigerant flows out of the intermediate heat exchanger 15a, passes through the second heat medium flow switching device 18a, flows out of the heat medium relay unit 3, and again flows into the outdoor unit 1.

The refrigerant, which has flowed into the outdoor unit 1, passes through the check valve 13c and flows into the heat source side heat exchanger 12, acting as an evaporator. The refrigerant, which has flowed into the heat source side heat exchanger 12, removes heat from the outdoor air in the heat source side heat exchanger 12, so that the refrigerant turns into low-temperature low-pressure gas refrigerant. The low-temperature low-pressure gas refrigerant leaving the heat source side heat exchanger 12 flows through the first refrigerant flow switching device 11 and the accumulator 19 and is again sucked into the compressor 10.

In this mode, the expansion device 16a is fully opened and the opening and closing device 17a is closed. Furthermore, the opening degree of the expansion device 16b is controlled to provide a constant subcooling, which is obtained as the difference between a saturation temperature converted from a pressure detected by the first pressure sensor 36 and a temperature detected by the third temperature sensor 35b. Alternatively, the expansion device 16b may be fully opened and the subcooling may be controlled through the expansion device 16a.

Next, the flow of the heat medium in the heat medium circuits B will be described. In the heating main operation mode, the intermediate heat exchanger 15b transfers heating energy of the heat source side refrigerant to the heat medium and the pump 21b allows the heated heat medium to flow through the pipes 5. In addition, in the heating main operation mode, the intermediate heat exchanger 15a transfers cooling energy of the heat source side refrigerant to the heat medium and the pump 21a allows the cooled heat medium to flow through the pipes 5. The heat medium, pressurized by the pumps 21a and 21b, leaving the pumps 21a and 21b flows through the second heat medium flow switching devices 23a and 23b into the use side heat exchangers 26a to 26d.

In the use side heat exchanger 26a, the heat medium removes heat from the indoor air, thus cooling the indoor space 7. In each of the use side heat exchangers 26b to 26d, the heat medium transfers heat to the indoor air, thus heating the indoor space 7. At this time, each of the flow control devices 25a and 25b allows the heat medium to be controlled at a flow rate necessary to provide an air conditioning load needed in the indoor space, such that the controlled flow rate of heat medium flows into the corresponding one of the use side heat exchangers 26a to 26d. The heat medium, which has passed through the use side heat exchanger 26a and has slightly increased in temperature, passes through the heat medium flow control device 25a and the first heat medium flow switching device 22a, flows into the intermediate heat exchanger 15a, and is again sucked into the pump 21a. The heat medium, which has passed through each of the use side heat exchangers 26b to 26d and has slightly decreased in temperature, passes through the corresponding one of the heat medium flow control devices 25b to 25d and the corresponding one of the first heat medium flow switching devices 22b to 22d, flows into the intermediate heat exchanger 15b, and is then again sucked into the pump 21b.

Throughout this mode, the first heat medium flow switching devices 22a to 22d and the second heat medium flow switching devices 23a to 22d allow the cold heat medium and the warm heat medium to be introduced to the use side heat exchanger 26a having the cooling load and the use side heat exchangers 26b to 26d having the heating load, respectively, without mixing with each other. In the pipe 5 in each of the use side heat exchanger 26a used for cooling and the use side heat exchangers 26b to 26d used for heating, the heat medium flows in the direction in which it flows from the corresponding one of the second heat medium flow switching devices 23a to 23d through the corresponding one of the heat medium flow control devices 25a to 25d to the corresponding one of the first heat medium flow switching devices 22a to 22d. Note that the air conditioning load needed in each indoor space 7 to be heated can be provided by controlling the difference between a temperature detected by the first temperature sensor 31b and a temperature detected by the corresponding second temperature sensor 34 at a target value, and the air conditioning load needed in the indoor space 7 to be cooled can be provided by controlling the difference between a temperature detected by the second temperature sensor 34 and a temperature detected by the first temperature sensor 31a at a target value.

As described above, in each of the four operation modes, the first heat medium flow switching devices 22a to 22d and the second heat medium flow switching devices 23a to 23d each switch between the passages and the heat medium flow control devices 25a to 25d each control the flow rate of the heat medium in accordance with an operation state of the corresponding one of the indoor units 2a to 2d. Actuation control means 60 of the heat medium relay unit control device 52 controls operations of the first heat medium flow switching devices 22, the second heat medium flow switching devices 23a to 23d, and the heat medium flow control devices 25a to 25d.

[Heat Medium Flow Switching Devices 22, 23 and Heat Medium Flow Control Devices 25]

As described above, the first heat medium flow switching devices 22a to 22d and the second heat medium flow switching devices 23a to 23d each include a three-way valve, for example. FIG. 7A is a graph illustrating the relationship between the opening degree and the period of time elapsed from start of opening of the first heat medium flow switching device 22 or 23 to completion of opening thereof. FIG. 7B is a schematic diagram illustrating heat medium flow states at opening degree levels 0, 500, and 1000. Referring to FIG. 7A, the flow rate and the flow direction through each of the first heat medium flow switching devices 22 and the second heat medium flow switching devices 23 change linearly depending on the opening degree. For example, it takes five seconds to change the opening degree from 0 to a maximum level=1000. Referring to FIG. 7B, each first heat medium flow switching device 22 can be controlled at three opening degree levels. At a first opening degree level=0, the first heat medium flow switching device 22 allows 100% of the heat medium flowing from a right passage to flow to an upper passage. At a second opening degree level=500, the first heat medium flow switching device 22 allows 50% of the heat medium flowing from the right passage to flow to the upper passage and also allows 50% thereof to flow to a left passage. At a third opening degree level=1000, the first heat medium flow switching device 22 allows 100% of the heat medium flowing from the right passage to flow to the left passage. On the other hand, each second heat medium flow switching device 23 can be controlled at three opening degree levels. At a first opening degree level=0, the second heat medium flow switching device 23 allows 100% of the heat medium flowing through a right passage to flow from an upper passage. At a second opening degree level=500, the second heat medium flow switching device 23 allows 50% of the heat medium flowing through the right passage to flow from the upper passage and also allows 50% thereof to flow from a left passage. At a third opening degree level=1000, the second heat medium flow switching device 23 allows 100% of the heat medium flowing through the right passage to flow from the left passage.

The heat medium flow control devices 25a to 25d each include a two-way valve, for example. FIG. 8A is a graph illustrating the relationship between the opening degree and the period of time elapsed from start of opening of the heat medium flow switching device 22 or 23 to completion of opening thereof. FIG. 8B is a schematic diagram illustrating heat medium flow states at opening degree levels 0, 500, and 1000. The flow rate through each heat medium flow control device 25 changes linearly depending on the opening degree. It takes five seconds to change the opening degree of each device to a maximum degree level.

Although FIGS. 7A and 8A illustrate the case where the opening degree changes linearly, the opening degree may change in curve, such as a quadratic curve. In addition, although FIGS. 7A and 8A illustrate the case where it takes five seconds to change the opening degree from 0 to 1000, the time varies depending on the kind of valve used as the heat medium flow switching device 22 or 23, or the heat medium flow control device 25.

[Actuation Control Means 60]

The actuation control means 60, which is disposed within the heat medium relay unit control device 52, includes an actuation unit (controller) for outputting drive signals to the first heat medium flow switching devices 22a to 22d, the second heat medium flow switching devices 23a to 23d, and the heat medium flow control devices 25a to 25d which are to be opened or closed. The actuation unit is not permitted to drive a plurality of valve mechanisms at the same time. The actuation unit transmits drive signals to the first heat medium flow switching devices 22a to 22d, the second heat medium flow switching devices 23a to 23d, and the heat medium flow control devices 25a to 25d at different times. In this case, the actuation control means 60 includes a limited number of actuation units, for example, one to three actuation units.

The actuation control means 60 further has a function of controlling start time of driving of the pumps 21a and 21b. Specifically, the actuation control means 60 has a function of starting to drive the pumps 21a and 21b when all of the first heat medium flow switching device 22a, the second heat medium flow switching device 23a, and the heat medium flow control device 25 corresponding to any one of the plurality of use side heat exchangers 26a to 26d are opened.

FIGS. 9 to 11 are tables each illustrating the first heat medium flow switching devices 22, the second heat medium flow switching devices 23, and the heat medium flow control devices 25 listed in the order of actuation, time of actuation of the pumps 21, and time of actuation of the compressor 10 in the use of the actuation control means including a single actuation unit. FIGS. 9 to 11 illustrate a case where all of the use side heat exchangers 26a to 26d are operated. If the heat medium does not flow through the use side heat exchangers 26c and 26d as illustrated in FIGS. 3 and 4, the first heat medium flow switching devices 22c and 22d, the second heat medium flow switching devices 23c and 23d, and the heat medium flow control devices 25c and 25d connected to the respective use side heat exchangers 26c and 26d are not opened.

Referring to FIG. 9, the actuation control means 60 performs control such that the first heat medium flow switching devices 22a to 22d, the second heat medium flow switching devices 23a to 23d, and the heat medium flow control devices 25a to 25d are actuated in that order (actuation pattern 1). Specifically, the actuation control means 60 actuates the first heat medium flow switching devices 22a, 22b, 22c, and 22d in that order and then actuates the second heat medium flow switching devices 23a, 23b, 23c, and 23d in that order. At the completion of opening of the heat medium flow switching devices 22 and 23, the actuation control means 60 actuates the heat medium flow control devices 25a, 25b, 25c, and 25d in that order.

At the completion of opening of the heat medium flow control device 25a, all of the first heat medium flow switching device 22a, the second heat medium flow switching device 23a, and the heat medium flow control device 25a corresponding to the indoor unit 2a are opened. The actuation control means 60 drives the pumps 21 at the completion of driving of the heat medium flow control device 25a. As described above, the use side heat exchanger 26a is fully opened 45 seconds after the start of the actuation. The pumps 21 are accordingly actuated 45 seconds after the start of the actuation.

As described above, the pumps 21 are actuated when all of the first heat medium flow switching device 22a, the second heat medium flow switching device 23a, and the heat medium flow control device 25a connected to the use side heat exchanger 26a, which is one of the plurality of use side heat exchangers 26a to 26d, are opened. This prevents an increase in pressure of the heat medium and thus prevents damage to the heat medium circuits B. The actuation of the compressor 10 does not have to be synchronized with the start time of driving of the pumps 21. Furthermore, finally opening the heat medium flow control devices 25a to 25d allows for a reduction in period of time elapsed from the time at which the heat medium is allowed to flow through the first use side heat exchanger 26a to the time at which the heat medium is allowed to flow through the final use side heat exchanger 26d. Thus, all of the indoor units 2a to 2d can be started to operate substantially at the same time.

FIG. 10 is a table illustrating another actuation pattern 2 in the use of the actuation control means including a single controller. Although FIG. 9 illustrates the case where the second heat medium flow switching devices 23 are opened after opening of the first heat medium flow switching devices 22, opening of the first heat medium flow switching devices 22a to 22d and the second heat medium flow switching devices 23a to 23d connected to all of the use side heat exchangers 26 may be performed and opening of the heat medium flow control devices 25a to 25d may be finally performed as illustrated in FIG. 10. Referring to FIG. 10, the actuation control means 60 actuates the valves for the indoor units 2a to 2c and then actuates the valves for the indoor unit 2d. As regards the actuation of the valves for the indoor units 2a to 2c, the first heat medium flow switching devices 22 and the second heat medium flow switching devices 23 are driven alternately (in this order of 22a, 23a, 22b, 23b, 22c, 23c, 22d, and 23d) to provide pre-actuation time. At completion of actuation of those devices, the actuation control means 60 drives the heat medium flow control devices 25a, 25b, 25c, and 25d in that order. In this case, the actuation control means 60 actuates the compressor 10 at start of actuation of the heat medium flow control device 25a and actuates the pumps 21 at completion of actuation of the heat medium flow control device 25a.

This also prevents an increase in pressure of the heat medium and thus prevents damage to the heat medium circuits B in a manner similar to the actuation pattern 1. Additionally, the final opening of the heat medium flow control devices 25a to 25d allows a reduction in period of time elapsed from the time at which the heat medium is allowed to flow through the first use side heat exchanger 26a to the time at which the heat medium is allowed to flow through the final use side heat exchanger 26d in a manner similar to the above-described actuation pattern 1. Thus, all of the indoor units 2a to 2d can be started to operate substantially at the same time. Although the amount of initial operation upon actuation of the air-conditioning apparatus 100 is large and the intervals between actuation instructions to the first heat medium flow switching devices 22, the second heat medium flow switching devices 23, and the heat medium flow control devices 25 has to be extended, the actuation pattern 2 can reduce the intervals between the actuation instructions.

FIG. 11 is a table illustrating another actuation pattern 3 in the use of the actuation control means 60 including a single actuation unit (controller). Referring to FIG. 11, the actuation control means 60 sequentially opens the first heat medium flow switching device 22, the second heat medium flow switching device 23, and the heat medium flow control device 25 for each of the use side heat exchangers 26a to 26d. Specifically, the actuation control means 60 actuates the first heat medium flow switching device 22a, the second heat medium flow switching device 23a, and the heat medium flow control device 25a for the use side heat exchanger 26a and then actuates the first heat medium flow switching device 22b, the second heat medium flow switching device 23b, and the heat medium flow control device 25b for the use side heat exchanger 26b. After that, the actuation control means 60 actuates the first heat medium flow switching device 22c, the second heat medium flow switching device 23c, and the heat medium flow control device 25c for the use side heat exchanger 26c. Finally, the actuation control means 60 actuates the first heat medium flow switching device 22d, the second heat medium flow switching device 23d, and the heat medium flow control device 25d for the use side heat exchanger 26d. The actuation control means 60 drives the pumps 21a and 21b at a time point, at which the three valves for the indoor unit 2a are fully opened, 15 seconds after the start of actuation.

In this case, the pumps 21 are actuated when all of the first heat medium flow switching device 22a, the second heat medium flow switching device 23a, and the heat medium flow control device 25a connected to the use side heat exchanger 26a, which is one of the plurality of use side heat exchangers 26a to 26d, are opened. This prevents an increase in pressure of the heat medium and thus prevents damage to the heat medium circuits B. The actuation of the compressor 10 does not have to be synchronized with the start time of driving of the pumps 21a and 21b. Furthermore, driving of the pumps 21a and 21b can be started at an early stage at which the heat medium is first allowed to flow through the use side heat exchanger 26a.

FIG. 12 is a table illustrating an actuation pattern 4 in the use of the actuation control means 60 including two actuation units (controllers). Referring to FIG. 12, the actuation control means 60 opens the first heat medium flow switching device 22, the second heat medium flow switching device 23, and the heat medium flow control device 25 for each of the use side heat exchangers 26a to 26d in that order in a sharing manner. Specifically, the actuation control means 60 allows the two actuation units to simultaneously drive two devices: the first heat medium flow switching device 22a and the second heat medium flow switching device 23a; the heat medium flow control device 25a and the first heat medium flow switching device 22b; the second heat medium flow switching device 23b and the heat medium flow control device 25b; the first heat medium flow switching device 22c and the second heat medium flow switching device 23c; the heat medium flow control device 25c and the first heat medium flow switching device 22d; and the second heat medium flow switching device 23d and the heat medium flow control device 25d. In this case, the pumps 21a and 21 b are driven at a time point, at which the heat medium is allowed to flow through the use side heat exchanger 26a, after a lapse of 10 seconds.

In this case, the pumps 21 are actuated when all of the first heat medium flow switching device 22a, the second heat medium flow switching device 23a, and the heat medium flow control device 25a connected to the use side heat exchanger 26a, which is one of the plurality of use side heat exchangers 26a to 26d, are opened. This prevents an increase in pressure of the heat medium and thus prevents damage to the heat medium circuits B. The actuation of the compressor 10 does not have to be synchronized with the start time of driving of the pumps 21a and 21b. Furthermore, since the two actuation units simultaneously actuate two devices of the devices 22, 23, and 25, the time can be reduced.

FIG. 13 is a table illustrating an actuation pattern 5 in the use of the actuation control means 60 including three actuation units (controllers). Referring to FIG. 13, the actuation control means 60 allows the three actuation units to open the first heat medium flow switching devices 22, the second heat medium flow switching devices 23, and the heat medium flow control devices 25 for the use side heat exchangers 26a to 26d in a sharing manner in the order of the use side heat exchangers 26a to 26d. Consequently, the first heat medium flow switching device 22a, the second heat medium flow switching device 23a, and the heat medium flow control device 25a for the use side heat exchanger 26a are simultaneously opened. Then, the first heat medium flow switching device 22b, the second heat medium flow switching device 23b, and the heat medium flow control device 25b are simultaneously opened. After that, the first heat medium flow switching device 22c, the second heat medium flow switching device 23c, and the heat medium flow control device 25c are simultaneously opened, and the first heat medium flow switching device 22d, the second heat medium flow switching device 23d, and the heat medium flow control device 25d are then simultaneously opened. In this case, the heat medium is allowed to flow through the use side heat exchanger 26a after a lapse of five seconds. At this time, the pumps 21a and 21b are driven.

In this case, the pumps 21 are actuated when all of the first heat medium flow switching device 22a, the second heat medium flow switching device 23a, and the heat medium flow control device 25a connected to the use side heat exchanger 26a, which is one of the plurality of use side heat exchangers 26a to 26d, are opened. This prevents an increase in pressure of the heat medium and thus prevents damage to the heat medium circuits B. The actuation of the compressor 10 does not have to be synchronized with the start time of driving of the pumps 21. Furthermore, the three actuation units simultaneously actuate the device 22, the device 23, and the device 25, thus reducing the time.

The present invention is not limited to Embodiment described above. For example, the above-described actuation patterns 1 to 5 have been described with respect to the case where the pumps 21a and 21b are in non-operation until valve opening of all of the first heat medium flow switching device 22a, the second heat medium flow switching device 23a, and the heat medium flow control device 25a for the use side heat exchanger 26a is completed. It is only required that the pumps are driven at a capacity for normal operation at the completion of the above-described opening. In other words, a pre-operation may be performed with a suppressed driving capacity so that the pumps are not completely stopped. Additionally, the start time of driving of the pumps 21 is not limited to the time at which actuation for a first branch is completed. The start time of driving of the pumps 21 may vary depending on the capacity of the pumps 21.

Although the case where the air-conditioning apparatus 100 includes the single outdoor unit has been described, the air-conditioning apparatus 100 may include a plurality of outdoor units.

The invention claimed is:

1. An air-conditioning apparatus comprising:
    a refrigerant circuit through which heat source side refrigerant is circulated, the refrigerant circuit including a compressor, a heat source side heat exchanger, a plurality of expansion devices, refrigerant passages of a plurality of intermediate heat exchangers, and a plurality of refrigerant flow switching devices, which are connected by refrigerant pipes, the refrigerant flow switching devices switching between circulation paths;
    a heat medium circuit through which water or brine as a heat medium is circulated, the heat medium circuit including a pump, a plurality of use side heat exchangers, a plurality of heat medium flow switching devices, a plurality of heat medium flow control devices, and heat medium passages of the intermediate heat exchangers, which are connected by heat medium pipes; and
    an actuation controller configured to perform control in such a manner that the heat medium flow switching device and the heat medium flow control device, which are connected to one of the use side heat exchangers being configured to perform a heating operation or a cooling operation are opened, and afterwards the heat medium flow control device connected to another one of the use side heat exchangers is opened,
    wherein the actuation controller is configured to control the pump in such a manner that a start time of driving of the pump is delayed later than start of actuation of the heat medium flow switching device and the heat medium flow control device connected to the one of the use side heat exchangers when starting the heat medium circuit for the heating operation or the cooling operation, and
    the compressor is configured to be actuated prior to an actuation of the pump or simultaneously with the actuation of the pump.

2. The air-conditioning apparatus of claim 1, wherein the actuation controller is configured to start driving of the pump immediately after both the heat medium flow switching device and the heat medium flow control device connected to the one of the use side heat exchangers are opened.

3. The air-conditioning apparatus of claim 1, wherein the actuation controller is configured to allow the pump to perform a pre-operation at a pump capacity less than a pump capacity for normal operation before the start time of driving of the pump, and to drive the pump at the pump capacity for normal operation after the start time of driving of the pump.

4. The air-conditioning apparatus of claim 1, wherein the actuation controller is configured to perform control in such a manner that the heat medium flow switching devices connected to the use side heat exchangers to operate among the use side heat exchangers are sequentially opened and, after that, the heat medium flow control devices connected to the use side heat exchangers to operate among the use side heat exchangers are sequentially opened.

5. The air-conditioning apparatus of claim 1, wherein the actuation controller is configured to perform control in such a manner that the heat medium flow switching device and the heat medium flow control device for each of the use side heat exchangers to operate among the use side heat exchangers are sequentially opened.

6. The air-conditioning apparatus of claim 1, wherein the actuation controller includes an actuation unit that sequentially opens the heat medium flow switching devices and the heat medium flow control devices on a one-by-one basis.

7. The air-conditioning apparatus of claim 1, wherein the actuation controller includes an actuation unit that sequentially opens the heat medium flow switching devices and another actuation unit that sequentially opens the heat medium flow control devices.

8. The air-conditioning apparatus of claim 1, wherein the actuation controller includes two actuation units that open the heat medium flow switching devices and the heat medium flow control devices in parallel.

* * * * *